UNITED STATES PATENT OFFICE.

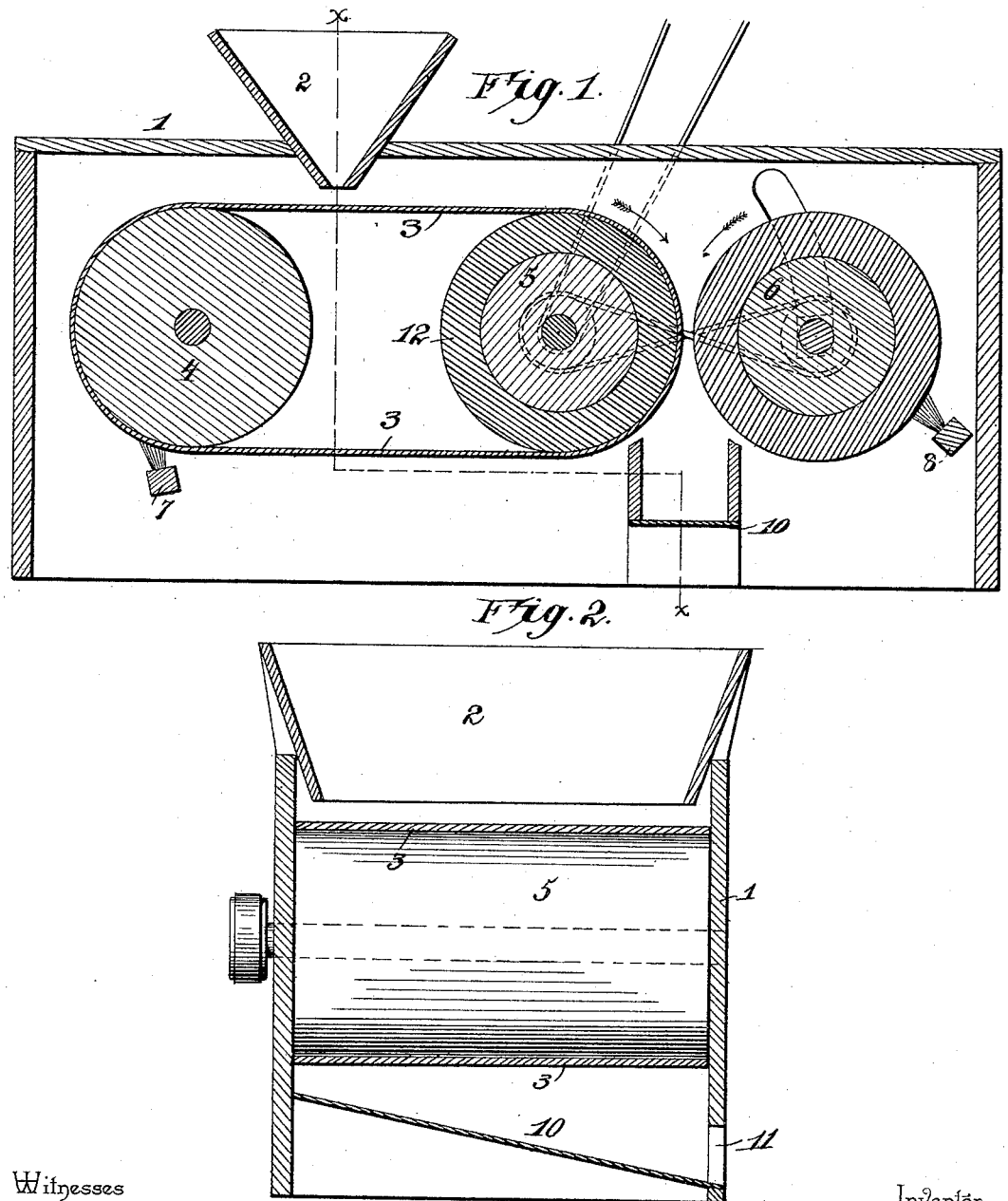

JACOB H. BISANER, OF LINCOLNTON, NORTH CAROLINA.

SEPARATOR.

SPECIFICATION forming part of Letters Patent No. 448,198, dated March 17, 1891.

Application filed November 26, 1890. Serial No. 372,677. (No model.)

*To all whom it may concern:*

Be it known that I, JACOB H. BISANER, a citizen of the United States, residing at Lincolnton, in the county of Lincoln and State of North Carolina, have invented a new and useful Separator, of which the following is a specification.

The invention relates to improvements in cockle-separators.

The object of the present invention is to simplify and improve the construction of cockle-separators and increase their power of separation.

The invention consists in the construction and novel combination and arrangement of parts hereinafter fully described, illustrated in the accompanying drawings, and pointed out in the claims hereto appended.

In the drawings, Figure 1 is a longitudinal sectional view of a cockle-separator constructed in accordance with this invention. Fig. 2 is a transverse sectional view.

Referring to the accompanying drawings, 1 designates a frame or casing, upon the top of which is mounted a hopper 2, in which is placed the seed to be cleaned and separated from cockle. Arranged beneath the hopper 2 is an endless belt 3 of rubber, passing around rolls 4 and 5, the latter of which is arranged adjacent to a rubber or cork covered roll 6, between which and the endless belt the seed passes to be cleaned. The hopper 2 is arranged between the rollers 4 and 5, and the seed from the hopper falls on the endless rubber belt and is carried in the direction of the rubber or cork covered roller 6, which rotates in the direction of the endless belt, as indicated by the arrow. The seed passing between the rollers 5 and 6 is cleaned and separated from cockle, which adheres to the rubber or cork covered roller 6 and to the endless rubber belt and is carried by the said belt and roller to the ends of the frame, where the belt and the roller 6 are cleaned by transversely-arranged stationary brushes 7 and 8. The brush 8 is arranged at one end of the frame or casing and is secured to the sides thereof and engages the periphery of the roller 6, and the brush 7 is arranged near the opposite end of the frame or casing and engages the belt at a point beneath the roller 4. The cleaned seed drops into a spout 10 and passes out of the machine through an opening 11 at one side thereof. The roller 4 is an ordinary wooden roller, while the roller 5 is constructed of wood and is provided with an elastic covering 12, which causes the belt to present a slightly-yielding surface to the seed passing between the rollers 5 and 6. The roller 5 is operated by suitable means, and the roller 6 may be connected with the roller 5 by a cross-belt to cause it to rotate in the direction of the arrow, or the friction between the belt and the roller 6 may be sufficient to cause such rotation.

In the operation of the device the seed passes between the belt and the roller 6, and, the cockle being of irregular, triangular, or pyramidal formation, the apexes adhere to the belt and roller, and the cockle will be entirely separated from the grain, which, when cleaned, passes out through the spout. It is necessary for the grain to pass between two rollers covered with rubber, cork, or other equivalent substance, as it is the point or apex of the grain that will adhere, and not the base or flat side. Wheat, rye, or oats will not adhere to the rolls or belt and of course drop into the spout under the rolls.

From the foregoing description and the accompanying drawings the construction, operation, and advantages of the invention will readily be understood by those skilled in the art.

What I claim is—

1. In a cockle-separator, the combination of the frame or casing provided with a suitable hopper, the endless rubber belt arranged beneath the hopper and adapted to receive seed therefrom, the rubber or cork covered roller 6, arranged adjacent the endless rubber belt, and the brushes engaging the belt and the roller 6 to remove cockle therefrom, substantially as described.

2. In a cockle-separator, the combination of the frame or casing, the rollers 4 and 5, the endless rubber belt arranged on said rollers, the hopper arranged above the belt at a point between the rollers, the rubber or cork covered roller 6, and the brushes engaging the roller 6 and the belt, substantially as described.

3. In a cockle-separator, the combination of the frame or casing, the rollers 4 and 5, the endless rubber belt arranged on the rollers, the rubber or cork covered roller 6, arranged adjacent to the roller 5, the hopper located above the belt and adapted to deliver seed thereon, the spout 10, arranged beneath the rollers 5 and 6 to receive clean seed, and the brushes engaging the belt and the roller 6, substantially as described.

In testimony that I claim the foregoing as my own I have hereto affixed my signature in presence of two witnesses.

JACOB H. BISANER.

Witnesses:
A. NIXON,
J. A. ROBINSON.